April 8, 1924.
W. W. HENDERSON
TOWLINE
Filed April 17, 1923
1,489,321
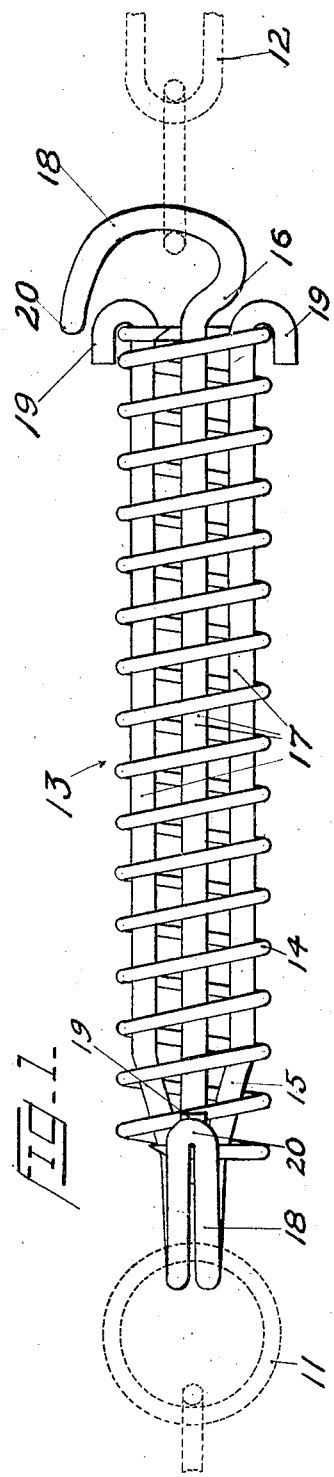
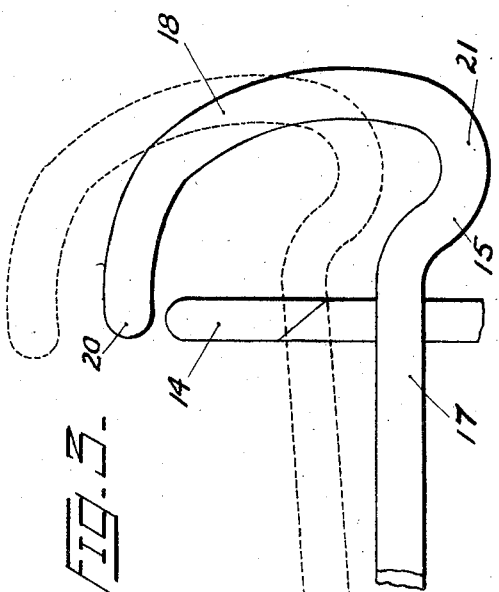
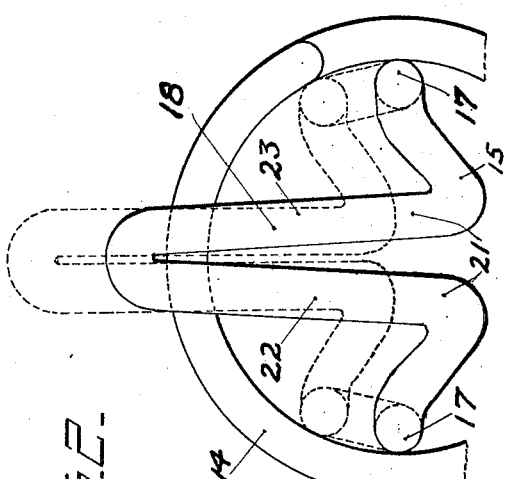
Inventor
W. W. Henderson.
By Harold C. Thorne
Attorney Patented Apr. 8, 1924.

1,489,321

UNITED STATES PATENT OFFICE.

WILLIAM W. HENDERSON, OF MINERAL WELLS, TEXAS.

TOWLINE.

Application filed April 17, 1923. Serial No. 632,744.

*To all whom it may concern:*

Be it known that WILLIAM W. HENDERSON, a citizen of the United States, residing at Mineral Wells, in the county of Palo Pinto and State of Texas, has invented certain new and useful Improvements in Towlines, of which the following is a specification.

This invention deals with tow lines primarily intended for use with automobiles and has for its object to improve the construction of such lines and devices connected therewith as hereinafter set forth in the specification, supplemented by drawings disclosing fundamentals and details of the constructions in accordance with the preferred embodiment of the invention, and claimed.

In the drawings forming a part of this specification, like characters of reference are used to designate the same parts in the three figures, in which,—

Figure 1 is a longitudinal elevation of a spring device having cables connected therewith in accordance with this invention, and Figures 2 and 3 diagrammatic views of end attaching members of the spring construction disclosed in Figure 1, on a large scale, showing the operation of the members.

Referring to Figure 1, parts of a tow line in accordance with this invention are disclosed, comprising cable or chain members 11 and 12, the inner ends of which only are shown, connected with a spring draft member 13. This spring is so constructed as to hook into tow line members, etc., so as to engage them in a manner so that the members will not become disengaged when the line is slack, but may be easily assembled and disassembled at will.

The draft spring 13 comprises a helical spring 14 arranged for compression loads received from two load members 15 and 16. As indicated by the drawings, these members may be identical in construction, each having a pair of longitudinal shanks 17 which pass through the spring 14 in opposite directions from the end hooks 18 for engaging draft chains or cables.

The load members are preferably formed from a length of spring rod bent into hooks 18 and shanks 17, and the ends are bent into smaller hooks 19 which engage the ends of spring 14. The two load members are shown arranged at right angles to each other in Figure 1 for the purpose of illustration, however the angular relation of the members may vary as well as their shape and other details of construction as will be readily understood.

The draft spring 13 may be readily assembled by drawing the shanks of the load members toward each other and fastening them together so that they will pass through the spring 14, after which they are released and the spring will be positioned on them as shown.

The shanks for a greater part of their length engage the spring and thus fix the end hooks 18, in their relation with the spring 14, preferably so that the ends 20 of the hooks will engage the spring and thus form a closure for retaining the ends of the tow lines, etc. As shown in Figures 2 and 3, these load members 15 are springs with the shanks engaging within the helical spring. In order to insert the end of a cable or link of a chain, the hooks are opened by applying pressure upon their backs at 21 relative to spring 14, and forcing the hook open as shown in dotted line position. It will be seen that the two portions 22 and 23 of the hook are wedged together as the hook is forced open, being contracted by the shanks moving to a smaller diameter of spring 14. The spring action of the members of the hooks 18 will close the gap between the spring and ends of the hooks at once upon removing the pressure from the backs of the hooks and will maintain the members in closed relation to each other.

It is understood that this invention is not limited to the specific embodiment hereinbefore shown and described for the purpose of illustration, but may be constructed in various other forms within the scope of the invention as defined in the following claims.

What is claimed as the invention and is desired to be secured by Letters Patent is:—

1. A tow line comprising two flexible cables having coupling elements at their ends, a spring adapted to be connected between said cables, a pair of connecting members secured to the spring and extending from its ends adapted to pass through coupling elements of the two cables, and means for normally yieldingly retaining the coupling elements against release from said members.

2. A tow line comprising two flexible cables for connection, one with a towing vehicle and the other to a vehicle to be towed, the free ends of which cables are provided with coupling elements, a draft spring adapted to be connected between said coupling elements, and load receiving members extending from the ends of said spring adapted to pass through said coupling elements and normally yieldingly retain them against release.

3. A tow line comprising two flexible cables for connection, one with a towing vehicle and the other to a vehicle to be towed, the free ends of which cables are provided with closed coupling elements in the form of links, a draft spring adapted to be connected between said coupling elements, load receiving members extending from the ends of said spring in the form of hooks adapted to pass through said elements and have their ends yieldingly held in a position with respect to the ends of the spring so as to form a closure for retaining the coupling elements against release.

4. A draft coupling comprising a helical compression spring, load members in the form of hooks extending from the ends of the spring, said members each having a pair of shanks extending from the hooks and passing through the helical spring and engagingly connected with the end of the spring opposite from said load receiving hook.

5. A connecting member for a helical compression spring comprising a rod bent upon itself so as to form two parallel shanks, the free ends of said rod shanks being bent to form hooks for engaging an end of the spring, and the closed ends thereof being rebent in the form of a hook.

6. A connecting member for a helical compression spring comprising a rod of flexible material bent upon itself and rebent to form a hook having two adjacent diverging side members formed into parallel shanks extending from the hook adapted to pass through the spring and engage diametrically opposite points along the convolutions of the spring, and means for securing the free ends of said shanks to the end of the spring.

7. A spring hook comprising a rod of flexible material bent upon itself and rebent to form a hook having two adjacent diverging side members formed into parallel shanks yieldingly held in a separated relation by the spring action of the rod between the diverging portions of the hook.

8. An attachment member for a helical spring comprising a spring hook having members extending therefrom yieldingly cooperating with the helical spring for normally holding the tip end of the hook in closed relation with respect to the end convolution of the helical spring.

9. A tow line comprising two independent flexible draft members having closed coupling elements at their adjacent ends, a spring adapted to be connected between said cables, and connecting members extending from the ends of said spring adapted to pass through said closed couplings and provided with means for normally retaining said closed couplings against release from said members.

In testimony whereof he affixes his signature.

WILLIAM W. HENDERSON.